United States Patent
Yamato et al.

(10) Patent No.: US 6,224,766 B1
(45) Date of Patent: May 1, 2001

(54) MEMBRANE TREATMENT METHOD AND MEMBRANE TREATMENT APPARATUS

(75) Inventors: Kimio Yamato, Sodegaura; Tadaaki Hashimoto, Sakura, both of (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/264,131

(22) Filed: Mar. 5, 1999

(30) Foreign Application Priority Data

Apr. 24, 1998 (JP) .................................................. 10-131436
Jun. 19, 1998 (JP) .................................................. 10-189746
Sep. 3, 1998 (JP) .................................................. 10-249767

(51) Int. Cl.$^7$ .................................................. B01D 63/08
(52) U.S. Cl. .............................. 210/321.75; 210/321.84; 210/231; 210/232; 210/641; 210/321.81; 210/321.9
(58) Field of Search ........................... 210/321.6, 321.75, 210/321.84, 231, 346, 488, 232, 641, 650, 321.81, 321.9, 195.2

(56) References Cited

U.S. PATENT DOCUMENTS

| | | | |
|---|---|---|---|
| 4,832,841 | * | 5/1989 | Gutman et al. ....................... 210/232 |
| 5,192,456 | * | 3/1993 | Ishida et al. ......................... 210/791 |
| 5,437,787 | * | 8/1995 | Ishida et al. ......................... 210/189 |
| 5,482,625 | * | 1/1996 | Shimizu et al. .................... 210/321.84 |
| 5,651,889 | * | 7/1997 | Wataya et al. .................... 210/321.75 |

* cited by examiner

*Primary Examiner*—Ana Fortuna
(74) *Attorney, Agent, or Firm*—Carter, Ledyard & Milburn

(57) ABSTRACT

In a membrane treatment method, raw liquid is supplied to a circulation tank, and circulation liquid is supplied into an inter-membrane passage between filtration membranes disposed within a membrane apparatus, which is disposed separately from the circulation tank. Filtrate is obtained from the circulation liquid within the inter-membrane passages via the filtration membranes, and the circulation liquid is circulated by a circulation pump disposed between the circulation tank and the membrane apparatus, while returning the remaining circulation liquid to the circulation tank. A portion of the circulation liquid overflows from the circulation tank. A membrane treatment apparatus comprises a membrane apparatus, a circulation tank, and a circulation pump. The membrane apparatus includes filtration membranes disposed to form an inter-membrane passage between the filtration membranes. The membrane apparatus takes out filtrate from circulation liquid in the inter-membrane passage. The circulation tank is disposed to the membrane apparatus. The interior of the circulation tank is filled with circulation liquid and raw liquid. The circulation pump is disposed between the circulation tank and the membrane apparatus and circulates the circulation liquid in order to establish a circulation path. The circulation tank has a discharge port for overflowing a portion of the circulation liquid and the raw liquid from the circulation tank.

8 Claims, 6 Drawing Sheets

PRIOR ART

MEMBRANE TREATMENT METHOD AND MEMBRANE TREATMENT APPARATUS

BACKGROUND OF THE INVENTION

1. Field of the Invention

The present invention relates to a membrane treatment method and apparatus for filtering a raw liquid such as sludge in an aeration tank for biological treatment, sludge discharged from the aeration tank, concentrated sludge obtained therefrom, waste water containing human excrement before being subjected to biological treatment, etc. More particularly, the present invention relates to a membrane treatment method and apparatus which can reduce costs, increase flux (flow volume per unit area of membrane), and decrease installation space.

2. Description of the Related Art

Waste water containing organic substances, nitrogen, phosphorus, etc., which would contaminate oceans, rivers and the like is generally subjected to biological treatment for conversion to clean water and is then discharged into a river, for example.

As means for separating the solid and liquid components of a reaction mixture resulting from biological treatment, a gravity-type settling tank has conventionally been used.

However, in recent years, a membrane separation technique has been used so as to reduce installation space and facilitate maintenance.

In such a membrane separation technique, steady production of filtrate over a prolonged period of time is very important. However, the volume of filtrate unavoidably decreases with passage of time. This problem is considered to be partly attributed to separated concentrated substances which deposit on the surface of a membrane and form a gel layer, which grows and hinders the passage of liquid to be filtered. The thickness of the gel layer increases as the concentration of contaminants in sludge increases and as the volume of filtrate increases. Accordingly, in the membrane separation technique, reduction in the thickness of the gel layer and removal of the generated gel layer are quite important.

Conventionally, a membrane treatment apparatus as shown in FIG. 5 is known. In FIG. 5, numeral 10 denotes a membrane apparatus, numeral 11 denotes a raw liquid tank for storing a raw liquid such as sludge, and numeral 12 denotes a pressurization pump. Numeral 13 denotes a frame which can be disassembled after removal of unillustrated packing seals. A plurality of membrane plates 14 are removably disposed within the frame 13. Each membrane plate 14 consists of a membrane support member 17 and membranes 18.

The membranes 18 are attached to both faces of the membrane support member 17 with a clearance 17a on each side.

Openings 15 and 16 for forming fluid passages are formed at upper and lower ends of each membrane plate 14, respectively.

Numeral 19 denotes discharge ports through which filtrate is discharged. Numeral 20 denotes a raw liquid inlet formed in the frame, and numeral 21 denotes a concentrated liquid outlet. Numeral 22 denotes inter-membrane passages through which raw liquid and/or concentrated liquid flows.

The raw liquid in the raw liquid tank 11 is led to the raw liquid inlet 20 by the pressurization pump 12. The raw liquid led to the membrane apparatus 10 flows into the inter-membrane passages 22 directly or via the opening(s) 16, so that the raw liquid is separated into concentrated liquid and filtrate that passes through the membranes 18.

The filtrate is led to the outside of the membrane apparatus 10 through the discharge ports 19. The concentrated liquid is returned to the raw liquid tank 11 via the concentrated liquid outlet 21 and is mixed with the raw liquid within the raw liquid tank 11. The above-described circulation is repeated by the action of the pressurization pump 12.

In general, the volume of liquid circulating within the inter-membrane passages 22 is determined on the basis of the flow rate of the liquid flowing through the inter-membrane passages 22. But, it is more important that the circulation volume is restricted depending on the diameter of the openings 15 and 16 formed at the upper and lower ends of the membrane plate 14. The openings 15 and 16 are designed to have a relatively large diameter such that a high circulation volume is secured in order to obtain a desired volume of filtrate; e.g., to have a diameter of about 65 mm.

Therefore, in order to conform to the relatively large openings, feed piping from the raw liquid tank 11 to the raw liquid inlet 20 and return piping from the concentrated liquid outlet 21 to the raw liquid tank 11 are designed to have a large diameter, thus increasing facility cost. Further, in addition to the piping, various types of accessories provided in the piping become larger, resulting in further increased facility costs.

In the conventional pressurized-type membrane processing apparatus using the pressurization pump 12, the horsepower (electrical power) of the pressurization pump 12 must be increased, since the volume of raw liquid fed from the raw liquid tank 11 to the inter-membrane passages 22 is large, and the raw liquid must be pressurized within the inter-membrane passages 22. Therefore, the conventional apparatus involves a problem of increased operating cost. Further, a pump of a large horsepower requires a large installation area.

When the membrane processing apparatus is operated in a state in which a pressure is applied to the raw liquid on the side of the membrane facing the inter-membrane passages 22 (on the side where sludge is circulated), the flow volume of filtrate increases temporarily. However, due to the increase in the flow volume of filtrate, growth of the gel layer on the membrane surface accelerates, with the result that the volume of filtrate decreases. In order to maintain a large flow volume of filtrate, higher power cost becomes necessary.

In order to solve the problems involved in the conventional pressurized-type membrane processing apparatus, a bubble-circulation-type membrane processing apparatus has been proposed.

As shown in FIG. 6, the proposed bubble-circulation-type membrane processing apparatus differs greatly from the conventional pressurized-type membrane processing apparatus in that no pressurization pump is used.

In FIG. 6, reference numeral 30 denotes a circulation tank disposed parallel to a membrane apparatus 10. The circulation tank 30 and the membrane apparatus 10 are connected with each other via an inlet pipe 32 for leading concentrated raw liquid to the membrane apparatus 10 and a discharge pipe 33 for discharging the concentrated raw liquid from the membrane apparatus 10. Thus, a circulation system is formed.

Reference numeral 40 denotes an aeration pipe inserted into the lower openings 16 and adapted to discharge fine air bubbles, reference numeral 41 denotes bubble discharge holes formed in the aeration pipe 40, and reference numeral 50 denotes a suction pump for suctioning filtrate.

The circulation tank 30 is constructed such that raw liquid is fed from an unillustrated raw liquid tank to a raw-liquid receiving port 31a, while excess concentrated liquid is allowed to overflow via a concentrated liquid discharge port 31b to thereby return to the raw liquid tank.

When air is supplied to the aeration pipe 40 to discharge fine bubbles from the discharge holes 41, within in the inter-membrane passages 22 there arises a difference in density between the raw liquid containing bubbles and the raw liquid newly supplied from the circulation tank 30. Due to this difference in density, a circulation flow is created between the membrane apparatus 10 and the circulation tank 30.

Meanwhile, filtrate is taken out to the outside via the discharge ports 19 by the action of the suction pump 50.

This apparatus offers the following advantage. Growth of gel layers on membrane surfaces is prevented, so that blocking due to sludge can be avoided while a large flow volume of filtrate is maintained. Further, sludge blocking can be prevented uniformly over the entire surface of membranes. Moreover, disassembly of the frame and cleaning of the membranes can be performed less frequently, and a pressurization pump of a large power can be eliminated, thereby contributing to a great reduction in cost.

The bubble-circulation-type membrane treatment apparatus can decrease cost as compared to the above-described pressurized-type membrane treatment apparatus. However, since the circulation flow is created by means of discharge of fine bubbles, the flow volume of liquid flowing through the inter-membrane passages is very small, resulting in a disadvantage of a low flux (rate of filtration per unit area of membrane).

Further, in recent years, there has been demand for reduction in space occupied by a membrane treatment apparatus that can treat a large volume of raw liquid. Therefore, development of a membrane treatment apparatus that meets such a requirement has been hoped for.

SUMMARY OF THE INVENTION

An object of the present invention is to provide a membrane treatment method and apparatus which can reduce costs and increase flux.

Another object of the present invention is to provide a membrane treatment apparatus which can produce a large volume of filtrate within a compact space.

Novel features of the present invention are set forth in the appended claims. However, the present invention itself and further objects and advantages thereof will become clearer by the following description of the invention and a preferred embodiment thereof.

DESCRIPTION OF THE INVENTION AND PREFERRED EMBODIMENTS

Figure 1:
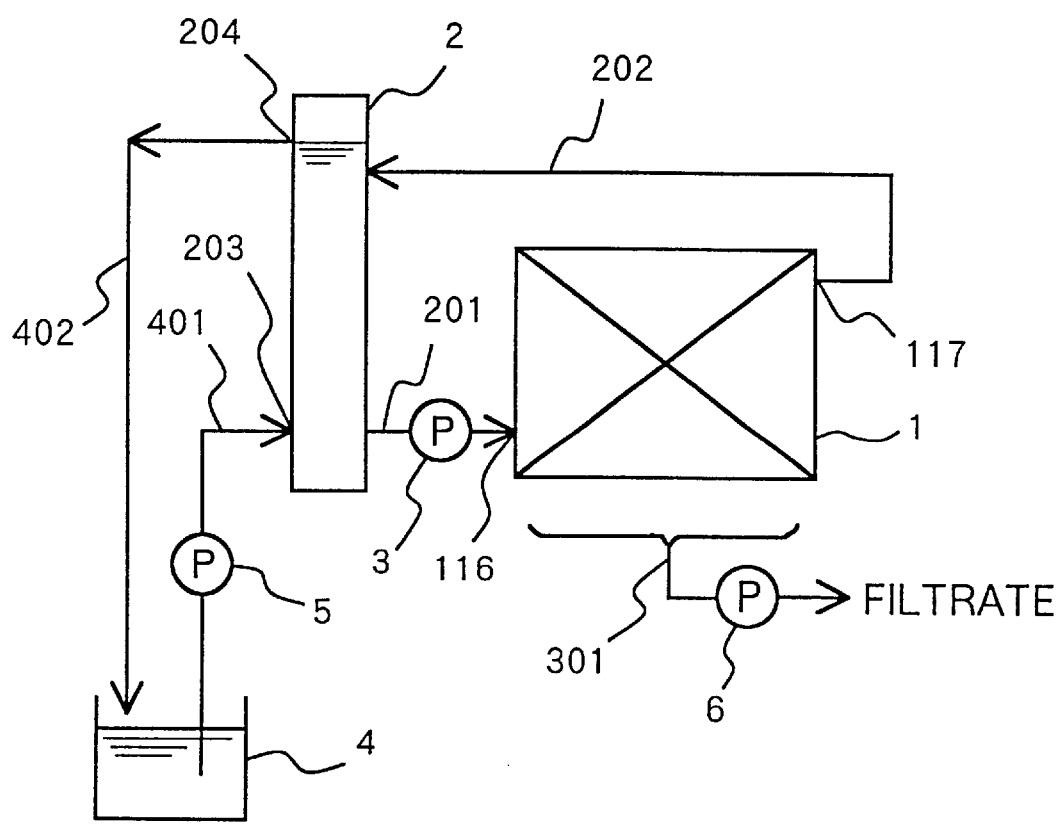
FIG. 1 is a flow diagram showing one embodiment of the membrane treatment apparatus of the present invention.

The membrane treatment method according to the present invention comprises the following five steps.

In the first step, raw liquid is supplied to a circulation tank. Examples of the raw liquid supplied to the circulation tank include sludge in an aeration tank for biological treatment; sludge discharged from the aeration tank and/or concentrated sludge obtained therefrom; waste water containing human excrement that has not yet been subjected to biological treatment; agglutinated liquid obtained from agglutination reaction resulting from addition of an agglutinating agent to waste water or sludge; and concentrated sludge and supernatant obtained through separation of the agglutinated liquid in a precipitation tank. Further, the membrane treatment apparatus according to the present invention can be used for recycling waste water, collecting valuable substances, utilizing rainwater, performing various separation/concentration treatments, performing various separation/concentration/purification treatments, and the like. Although no limitation is imposed on the shape of the circulation tank, the circulation tank is preferably in the shape of a cylindrical container.

A raw liquid pump may be used for supply of raw liquid to the circulation tank. The volume of raw liquid supplied by the pump depends on the volume of filtrate to be extracted (treatment volume), and is very small compared to the conventional case where a pressurization pump is used. Since the supply volume is small, the horsepower of the pump can be decreased, and the sizes of pipes and accessories attached to the pipes can be decreased, thus contributing to reduction in facility cost.

In the second step, a circulation liquid is supplied into an inter-membrane passage formed between filtration membranes that are disposed within a membrane apparatus, which is disposed separately from the circulation tank. In view of reduction in cost, the membrane apparatus is preferably disposed in the vicinity of the circulation tank.

A plurality of filtration membranes are advantageously disposed in order to form a plurality of inter-membrane passages. In the present invention, a circulation pump is used in order to supply circulation liquid into the inter-membrane passages.

No limitation is imposed on the membranes used in the present invention, and, for example, either ultra filtration membranes or precision filtration membranes may be used. The membranes preferably have the form of a flat membrane.

In the third step, filtrate is extracted from the circulation liquid within the inter-membrane passages via the filtration membranes. In the present invention, the means for extracting filtrate may be either means that utilizes a suction pump or means that utilizes the water-head pressure of the circulation tank. The water-head pressure of the circulation tank denotes potential energy that is derived from the height of the liquid surface of the circulation tank.

When a suction pump is used, the filtration volume can be set by the suction pump. For example, the volume of suction filtration by the suction pump can be set to 1/20 to 1/2 (volume ratio) the volume of raw liquid.

In the fourth step, while returning the remaining circulation liquid to the circulation tank, the circulation liquid is circulated by means of a circulation pump disposed between the circulation tank and the membrane apparatus. The circulation pump may be provided at any position within the circulation system of the circulation liquid. In view of ease of installation, the circulation pump is preferably disposed at a portion through which liquid is supplied from the circulation tank to the inter-membrane passages; i.e., at an inlet communicating with the inter-membrane passages.

The circulation pump causes liquid circulation within the inter-membrane passages, and is not designed for applying pressure for extracting filtrate. The pressure generated by the circulation pump is adjusted such that the flow rate of liquid within the inter-membrane passages falls within the range of 0.5 to 3.0 m/sec (in consideration of pressure loss generated in the inter-membrane passages). This flow rate is higher than that in the case of a conventional suction-type membrane treatment apparatus that utilizes air bubbles and allows the surface of the membranes to be cleaned by liquid circulated between the membranes, without affecting the suction action of the suction pump.

In the present invention, the circulation pump is used in order to form a circulation system. In the present invention, in addition to the circulation pump, a raw liquid pump or the like is required for introducing raw liquid into the circulation system.

In the fifth step, a portion of the circulation liquid is caused to overflow from the circulation tank. A discharge port is provided at the upper portion of the circulation tank, and a portion of the circulation liquid overflows through the discharge port. The vertical position of the discharge port defines the liquid surface of the circulation tank in the above-described fourth step. In the present invention, overflow prevents excessive increase of concentration of concentrated substances within the membrane apparatus. That is, when filtrate is extracted from the circulation liquid, the concentration of concentrated substances in raw liquid and circulation liquid within the membrane apparatus increases. Therefore, in order to prevent concentration increase, the raw liquid is supplied to the circulation tank, and excess raw liquid and circulation liquid within the circulation tank are caused to overflow via the discharge port and return to the raw liquid tank, thus preventing abnormal increase in the concentration of concentrated substances within the membrane treatment apparatus.

The membrane treatment method according to the present invention may be modified in various ways within the scope of the above-described concept.

Preferred embodiments of the membrane treatment apparatus of the present invention will now be described with reference to the drawings.

Figure 2:
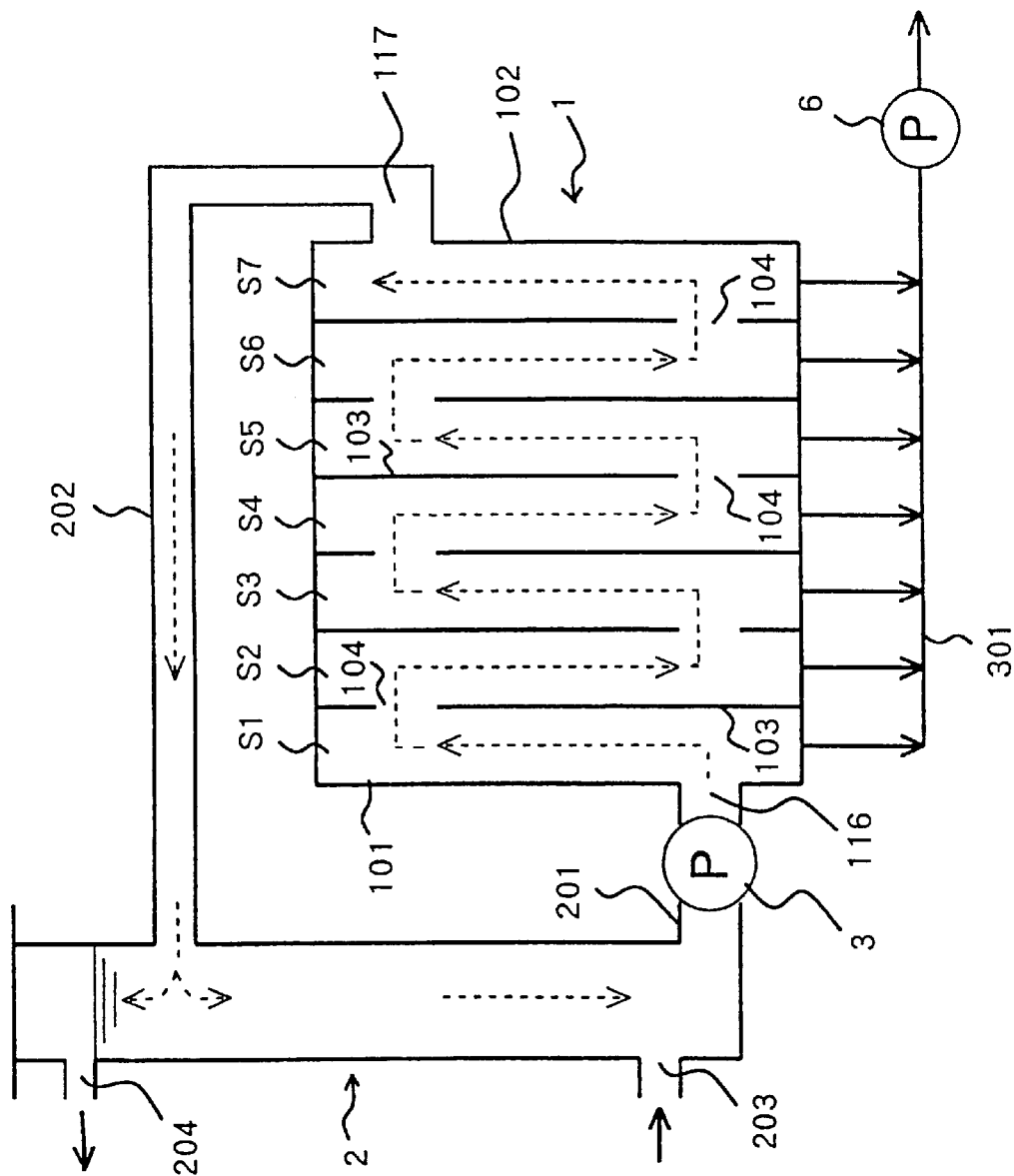
FIG. 2 is a schematic structural diagram of a main portion of the membrane treatment apparatus of FIG. 1.
Figure 3:
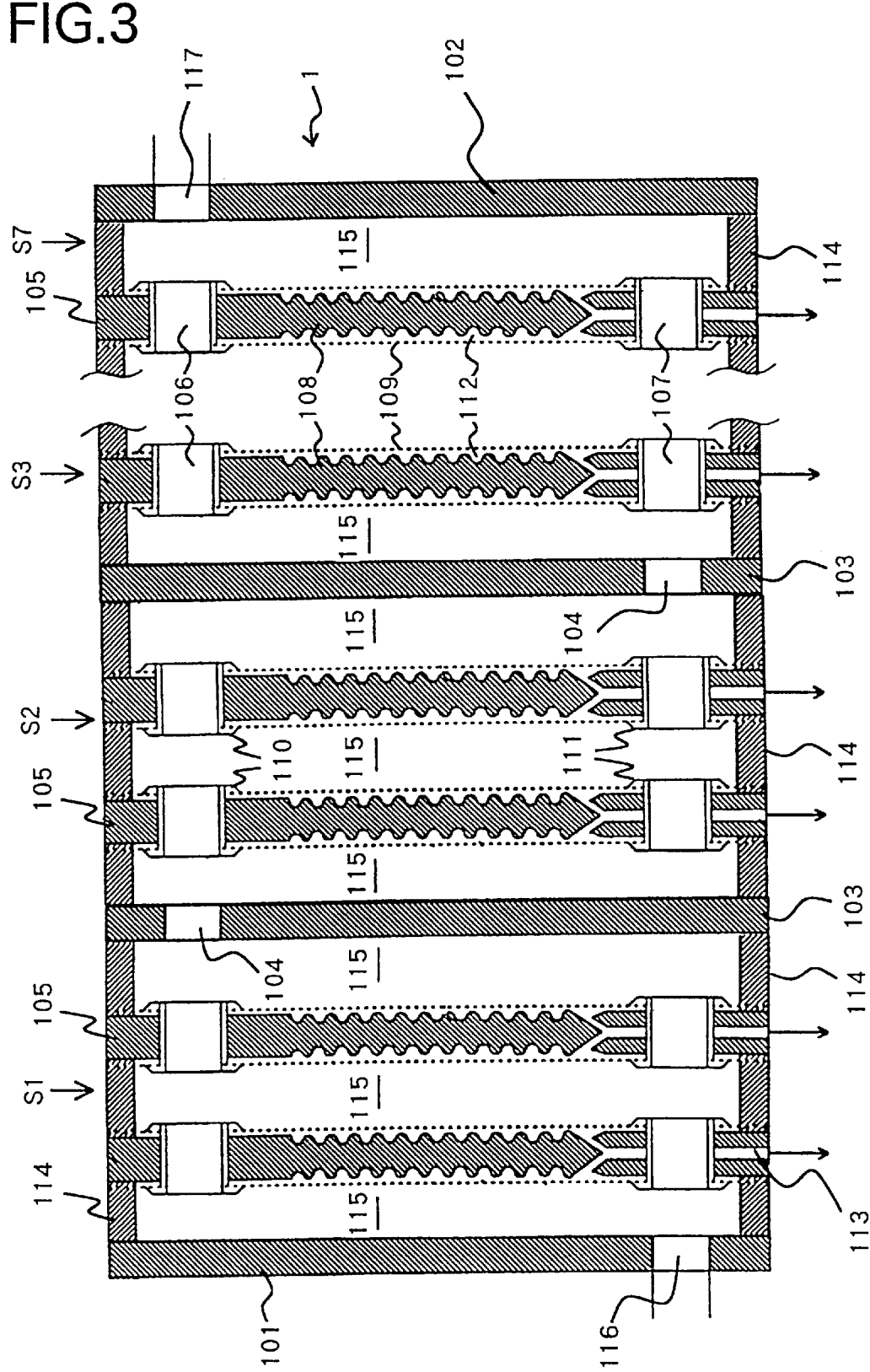
FIG. 3 is a cross-sectional view of a main portion of a membrane apparatus used in the membrane treatment apparatus of FIG. 1.

FIG. 1 is a flow diagram showing one embodiment of the membrane treatment apparatus of the present invention; FIG. 2 is a schematic structural diagram of a main portion of the membrane treatment apparatus of FIG. 1; and FIG. 3 is a cross-sectional view of a main portion of a membrane apparatus used in the membrane treatment apparatus of FIG. 1.

In these drawings, reference numeral 1 denotes a membrane apparatus for separating raw liquid into filtrate and concentrated liquid; reference numeral 2 denotes a circulation tank for supplying raw liquid to the membrane apparatus 1 and for storing the raw liquid, as well as concentrated liquid that is separated from raw liquid by the membrane apparatus 1 and returned therefrom; reference numeral 3 denotes a circulation pump for creating circulation flow between the membrane apparatus 1 and the circulation tank 2; reference numeral 4 denotes a raw liquid tank for storing raw liquid; and reference numeral 5 denotes a raw liquid pump for supplying raw liquid from the raw liquid tank 4 to the circulation tank 2. Reference numeral 6 denotes a suction pump for extracting filtrate.

The membrane apparatus 1 comprises frame plates 101 and 102, which are disposed vertically with a predetermined space therebetween and which constitute openable side frames. A plurality of partition plates 103 are disposed vertically between the frame plates 101 and 102 in order to partition the space between the frame plates 101 and 102 into a plurality of blocks. In the embodiment shown in FIG. 2, six partition plates 103 are disposed in order to partition the space between the frame plates 101 and 102 into seven blocks S1 to S7.

A liquid-path opening 104 is formed in each partition plate 103 at an upper or lower portion thereof. Through the liquid-path openings 104, adjacent blocks are connected to each other. As shown in FIG. 2, the partition plates 103 may be designed such that alternate partition plates 103 have the liquid-path opening 104 at their upper portions and the remaining partition plates 103 have the liquid-path opening 104 at their lower portions, so that liquid flow upward in alternate blocks and flow downward in the remaining blocks.

As shown in FIG. 3, in each of the blocks of the membrane apparatus 1 partitioned by the partition plates 103, a plurality of membrane plates 105 are disposed vertically.

Each of the membrane plates 105 consists of a membrane support member 108 having openings 106 and 107 at the upper and lower ends thereof, and flat membranes 109 which are attached to both faces of the membrane support member 108. Adjacent openings 106 form a liquid column at an upper portion of the apparatus, whereas adjacent openings 107 form a liquid column at a lower portion of the apparatus.

The flat membranes 109 are fixed by seal rings 110 and 111 fitted into the upper and lower openings 106 and 107, respectively.

The membrane support member 108 is formed of a plate material, and both side surfaces thereof are unevenly formed to have a wavy cross section.

The flat membranes 109 cooperate with the membrane support member 108 to form a clearance between either side surface of the membrane support member 108 and the corresponding flat membrane 109, to thereby form a discharge portion 112, through which filtrate passed through the flat membrane 109 flows.

No limitation is imposed on the flat membranes 109 insofar as they can allow raw liquid to be filtered under a relatively low pressure; an ultrafiltration membrane, a precision filtration membrane, or the like can be used as the filtering membrane. However, there is preferably used a membrane that can filter raw liquid in a state in which a pressure differential of not greater than 1 $kg/cm^2$ exists between the raw liquid side and the filtrate side of the membrane.

Reference numeral 113 denotes filtrate discharge ports provided at the lower ends of the membrane support members 108. The filtrate discharge ports 113 are connected to a collecting tube 301. Thus, the above-described discharge portions 112 are connected to the suction pump 6. When suction force is generated by the suction pump 6, filtrate enters the discharge portions 112 after passing through the flat membranes 109 and is led to the outside via the collecting tube 301.

A packing 114 is disposed between adjacent membrane plates 105, between the frame plate 101 or 102 and the corresponding membrane plate 105, and between each partition plate 103 and the corresponding membrane plate 105, such that the packing 114 runs along the outer edge of the membrane plate 105 in order to prevent liquid from leaking to the outside. Accordingly, the membrane apparatus 1 is watertight manner by virtue of the packings 114 and the frame plates 101 and 102 constituting side frames.

Simultaneously, the packings 114 form inter-membrane passages 115 between adjacent membrane plates 105, between the frame plate 101 or 102 and the corresponding membrane plate 105, and between each partition plate 103 and the corresponding membrane plate 105, so that raw liquid or concentrated liquid flows through each inter-membrane passage 115. Therefore, the width of an inter-membrane passage 115 is defined by the corresponding packing 114, and the width of the inter-membrane passage 115 can be adjusted through adjustment of the thickness of the packing 114.

From the viewpoint of preventing blockage of the inter-membrane passages 115, the inter-membrane passages 115 preferably have a width equal to or greater than 1.5 mm, more preferably equal to or greater than 3.0 mm. From the viewpoint of the volume efficiency of the membrane apparatus 1, the width of the inter-membrane passages 115 is preferably 8.0 mm at most, more preferably 6.0 mm at most.

Further, for the membrane plates 105, the packing 114 provides a function of fixing the outer edges of the flat membranes 109 to opposite side surfaces of the membrane support members 108.

The number of blocks (number of the partition plates 103) in the membrane apparatus 1 and the number of the membrane plates 105 provided in each block can be freely determined in consideration of various conditions such as flux, treatment volume, and the capacity of the circulation pump 3. Therefore, the number of blocks and the number of membrane plates are not limited to those in the illustrated example.

In the membrane apparatus 1, an inlet port 116 for receiving raw liquid is formed in the frame plate 101, and an outlet port 117 for discharging concentrated liquid is formed in the frame plate 102. As shown in FIG. 2, the inlet port 116 and the outlet port 117 are connected to the circulation tank 2 via piping tubes 201 and 202, respectively.

In the example shown in FIG. 2, the inlet port 116 is formed in the lower portion of the frame plate 101, and the outlet port 117 is formed in the upper portion of the frame plate 102. Accordingly, there is formed a circulation system in which raw liquid that has been led from the circulation tank 2 via the piping tube 201 flows into the inlet port 116; the raw liquid then flows through the inter-membrane passages 115, the openings 106 and 107,(see FIG.3), and the liquid-path opening 104 in each of the blocks S1–S7 such that the liquid flows alternately upward and downward in the blocks S1–S7; and the raw liquid then returns to the circulation tank 2 via the outlet 117 and the piping tube 202.

The circulation tank 2 is disposed to the membrane apparatus 1 in order to store raw liquid supplied from the raw liquid tank 4 and concentrated liquid discharged from the membrane apparatus 1, as well as to supply new raw liquid to the membrane apparatus 1.

A raw-liquid receipt port 203 is provided at the lower portion of the circulation tank 2 in order to receive raw liquid from the raw liquid tank 4. Further, a discharge port 204 is formed at the upper portion of the circulation tank 2 to be located higher than a connection portion where the piping tube 202 is connected to the circulation tank 2. The discharge port 204 allows concentrated liquid—which has been circulated from the outlet port 117 of the membrane apparatus 1 into the circulation tank 2—to overflow and return to the raw liquid tank 4.

When filtrate is suctioned by the suction pump 6, the concentration of the concentrated substance in raw liquid within the membrane apparatus 1 increases. Therefore, in order to prevent an increase in concentration, raw liquid is supplied to the circulation tank 2 from the raw-liquid receipt port 203, and excess raw liquid and circulation liquid within the circulation tank 2 overflow via the concentrated liquid discharge port 204 and return to the raw liquid tank 4. This prevents an abnormal increase in the concentration of concentrated substance within the membrane apparatus.

Further, the membranes can be cleaned easily by a method in which the membrane treatment apparatus is completely drained of raw liquid, and cleaning water is poured therein and circulated. Therefore, no special cleaning device is required. Cleaning with a chemical can also be performed easily through addition of a chemical into the circulation tank 2.

The circulation pump 3 is disposed in a circulation path (circulation system) between the membrane apparatus 1 and the circulation tank 2 in order to circulate liquid throughout the circulation path. After passing through the inter-membrane passage 115 in the middle of the circulation path, raw liquid is caused, by suction action of the suction pump 6, to pass through the flat membrane 109 to thereby be filtered. By action of the suction pump 6, filtrate produced from the filtration is led to the outside of the membrane apparatus 1 via the filtrate discharge portion 112 and the filtrate collection tube 301. Meanwhile, concentrated liquid flows through the inter-membrane passages 115, the openings 106 and 107, and the liquid-path opening 104 and returns to the circulation tank 2 via the outlet port 117 and the piping tube 202 to be mixed with new raw liquid.

The circulation pump 3 is preferably interposed in the piping tube 201 which is disposed between and connected to the inlet port 116 of the membrane apparatus 1 and the circulation tank 2, which are located in the middle of the circulation path.

The circulation pump 3 is used for circulating liquid within the circulation path formed between the membrane apparatus 1 and the circulation tank 2. Further, raw liquid flowing within the membrane apparatus 1 is suctioned and filtered by action of the suction pump 6. Therefore, the circulation pump 3 is not required to produce high pressure as compared with the case of a pressurization pump used in a conventional pressurized-type membrane treatment apparatus. In the pressurized-type membrane treatment apparatus, although the filtration volume can be increased by means of pressurization, growth of a gel layer on the membrane surface increases resultantly, so that the filtration volume decreases. In a conventional bubble-circulation-type membrane treatment apparatus, air is introduced in order to eliminate the necessity of the pressurization pump and decrease power cost, and growth of a gel layer is simultaneously suppressed through discharge of fine bubbles. However, simultaneously with this, flux also decreases. In the present invention, flux can be increased compared with the case of the conventional bubble-circulation-type membrane treatment apparatus, by virtue of the structure in which the interior of the membrane apparatus 1 is divided into a plurality of blocks by the partition plates 103; the membrane plates 105 are disposed in each block; the circulation pump 3 is interposed in the circulation path formed between the circulation tank 2 and the membrane apparatus 1; and filtrate is obtained by the suction pump 6.

Further, since raw liquid is filtered by means of the suction pump 6 simultaneously with circulation of liquid effected by the circulation pump 3, the circulation pump 3 is required to produce only power for circulating liquid within the circulation path. Therefore, a large pressure is not required to be applied to the inter-membrane passages 115 as has been practiced in the conventional pressurized-type membrane treatment apparatus.

Although in the above-described embodiment filtrate is extracted by the suction pump, the present invention is not limited thereto, and filtrate may be extracted through utilization of water-head pressure of the circulation tank. That is, membrane filtration is performed through utilization of water-head pressure of the circulation tank in order to extract filtrate without use of a special power source such as a suction pump and independently of pressure of the circulation pump. If the circulation pump produces forcing pressure, filtrate can be extracted through sole use of the circulation pump. However, the apparatus of the present embodiment is not designed to extract filtrate through use of pressure of the circulation pump.

In order to secure such a water-head pressure, in FIG. 2, the discharge port 204—through which a portion of circulation liquid and raw liquid within the circulation tank 2 overflows—is preferably located at a position higher than the center of the outlet 117 located at the upper portion of the membrane apparatus 1, and more preferably at least 0.5 m higher than the center of the outlet 117. If the height difference is excessive, the volume of filtrate does not increase in proportion to increase in the size of the facility. Therefore, the upper limit of the height difference is about 5 m.

Figure 4:
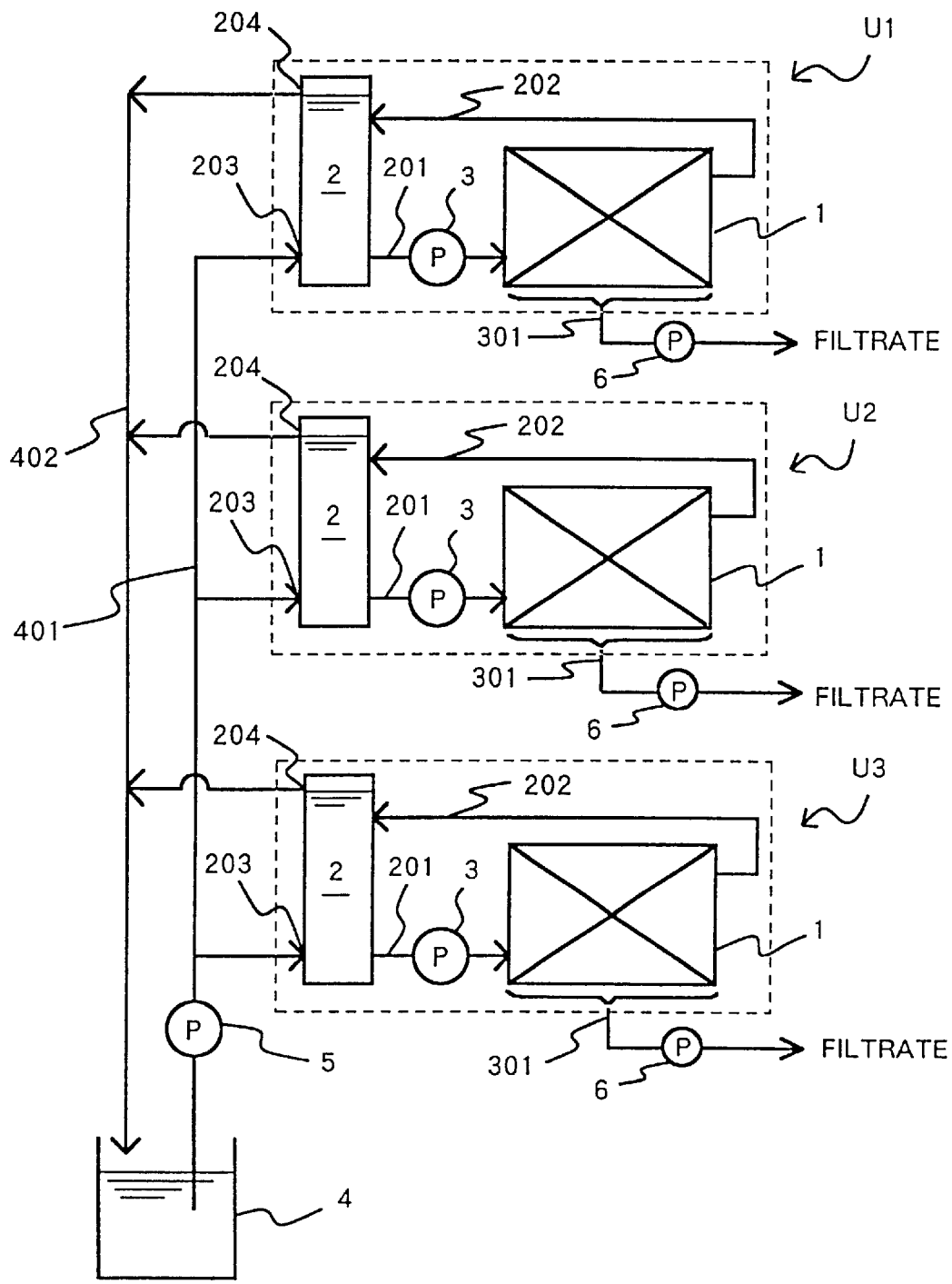
FIG. 4 is a schematic structural diagram showing another embodiment of the membrane treatment apparatus.
Figure 5:
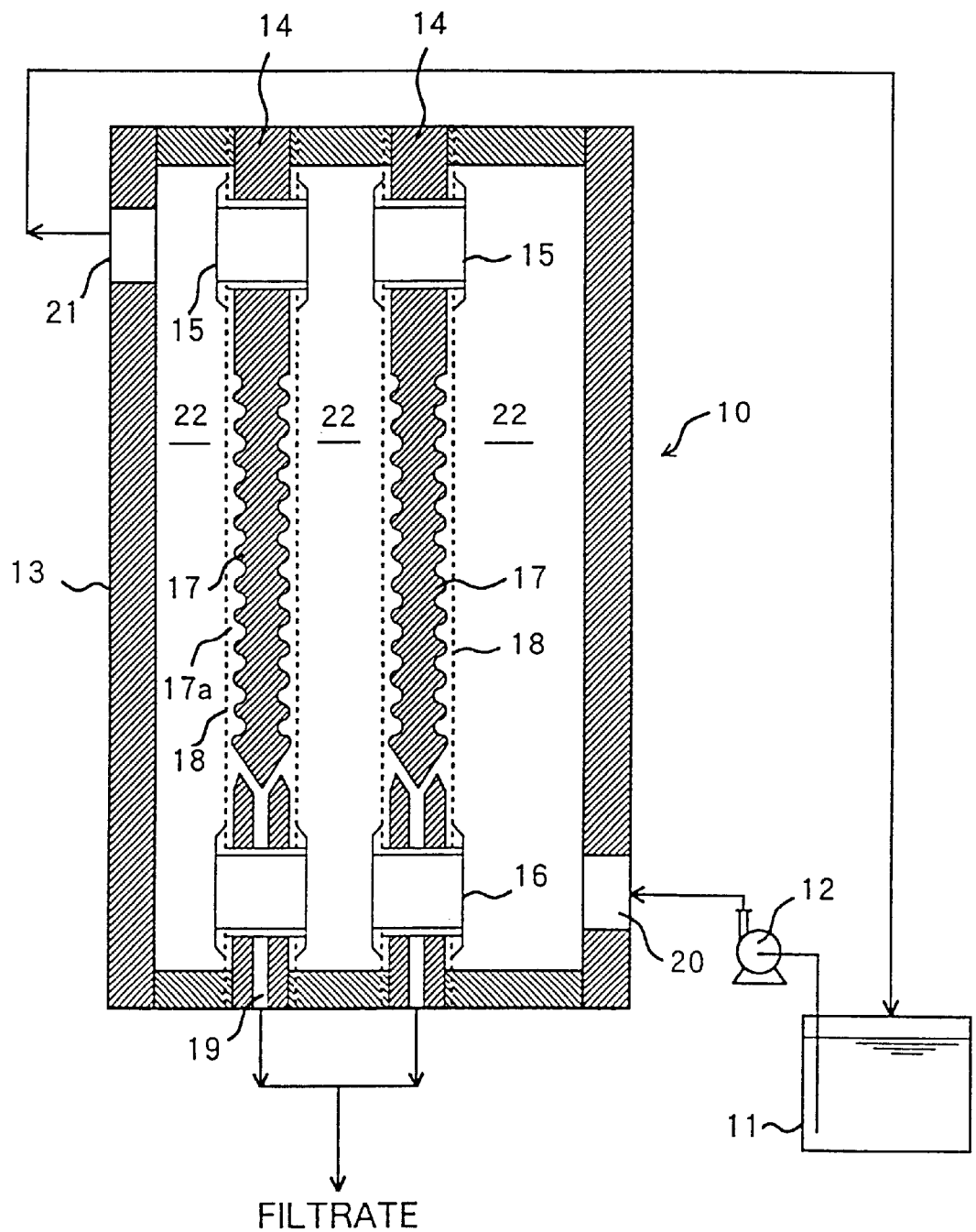
FIG. 5 is a cross-sectional view of a conventional pressurized-type membrane treatment apparatus.
Figure 6:
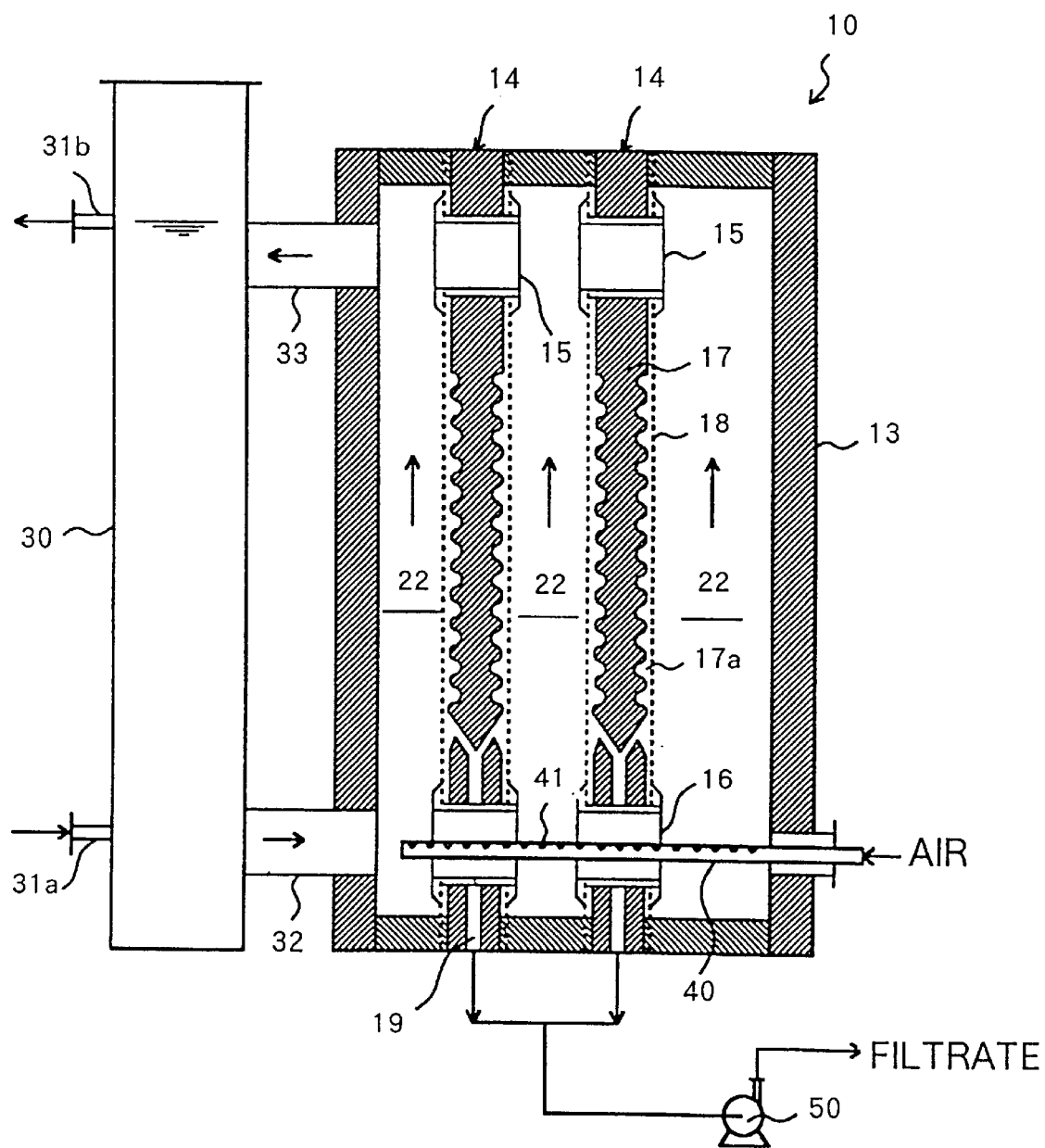
FIG. 6 is a cross-sectional view of a conventional bubble-circulation-type membrane treatment apparatus.

FIG. 4 is a schematic structural diagram showing another embodiment of the membrane treatment apparatus according to the present invention.

In the membrane treatment apparatus of the present embodiment, the structural components, such as the membrane apparatus 1, the circulation tank 2, and the circulation pump 3, which are the same as those of the membrane treatment apparatus shown in FIGS. 1 to 3 are denoted by the same reference numerals, and detailed descriptions of these structural components are omitted.

In the membrane treatment apparatus of the present embodiment, the membrane apparatus 1, the circulation tank 2, and the circulation path (circulation system) into which the circulation pump 3 is disposed constitute a single membrane treatment unit U. Through an increase in the number of the membrane treatment units U having the membrane apparatus 1 for membrane treatment, a demand for increased treatment volume can be coped with easily.

Although FIG. 4 shows a case where three membrane treatment units U; i.e., U1 to U3 are provided, the number of membrane treatment units U can be freely determined in accordance with a desired volume of raw liquid to be treated (treatment volume), and therefore is not limited to the number of the illustrated example.

Raw liquid is supplied from a single raw liquid tank 4 to the circulation tank 2 of each membrane treatment unit U via a supply pipe 401 and by means of a single raw liquid pump 5, which is shared among the membrane treatment units U1 to U3. In each of the membrane treatment units U1 to U3, the circulation pump 3 is disposed in the circulation system for circulating liquid between the membrane apparatus 1 and the circulation tank 2, and a flow of a predetermined rate is created in the inter-membrane passages 115 by operation of the circulation pump 3 only. Therefore, the raw liquid pump 5 is only required to feed raw liquid from the raw liquid tank 4 into the circulation tank 2, and is not required to be driven in order to create the flow of liquid within the inter-membrane passages 115. Accordingly, it becomes possible to share the single raw liquid pump 5 among the membrane treatment units U1–U3.

That is, as described above, even when the number of the membrane apparatuses 1 is increased, the flow within the inter-membrane passages 115 of each of the membrane apparatuses 1 is created by the circulation pump 3, which is disposed in the circulation system formed between the membrane apparatus 1 and the circulation tank 2, and the raw liquid pump 5 is only required to feed raw liquid. Therefore, the raw liquid pump 5 is not required to increase in number or size even when the number of the membrane treatment units U is increased. Accordingly, even when the number of membrane treatment units U is increased in order to cope with an increased treatment volume, proper operation is guaranteed through use of the single raw liquid pump 5 as in the conventional apparatus. Therefore, the facility cost does not increase excessively as compared with the case of conventional apparatuses, and the installation space of the raw liquid pump 5 does not increase.

Further, since the respective membrane treatment units U1 to U3 can share a piping tube 401 for transporting and supplying raw liquid from the raw liquid tank 4 to the circulation tank 2 of each of the membrane treatment units by action of the single raw liquid pump 5, and can also share a piping tube 402 for returning raw liquid that overflows from the circulation tank 2. Therefore, the cost involved in accessories interposed in these piping tubes 401 and 402 does not increase excessively as compared with the case of the conventional apparatus.

Accordingly, the membrane treatment apparatus can decrease cost and installation space, while increasing treatment volume.

Moreover, since the respective membrane processing units U1 to U3 share the single raw liquid pump 5, the membrane processing units U1 to U3 can be easily cleaned in an automated manner in which the raw liquid pump 5 is stopped, and cleaning water is charged into the respective circulation tanks 2. Also, the membrane processing units U1 to U3 may be cleaned individually in an automated manner. In this case, a control valve is disposed at the inlet of the circulation tank of each unit. While the raw liquid pump 5 is operated, the respective control valves are opened and closed in order to clean each unit individually.

In the membrane treatment units U1 to U3 of the present membrane treatment apparatus as well, the above-described suction pump 6 may be provided in order to extract filtrate that is filtered, via the flat membranes 109, from the raw liquid flowing through the inter-membrane passages 115; or alternatively, filtrate may be extracted through utilization of the water-head pressure of the circulation tank.

In the present invention, as compared to the number of units, a small number of raw liquid pump(s) is required. Therefore, the number of units may be increased in order to enable treatment of a larger volume of raw liquid as compared with the illustrated case in which three units are disposed for one raw liquid pump. Moreover, a further increased volume of liquid can be treated through employment of an increased number of raw liquid pumps and units.

In the above-described embodiments, plates having uneven surfaces are used as the membrane support members 108. However, the present invention is not limed thereto, and the membrane support members 108 may be plates having a porous structure or plates made of synthetic fibers.

EXAMPLES

Example 1

(Test Conditions)
Membrane apparatus:
  Model: UFP-70 5S17P (product of Mitsui chemicals, INC., the number followed by "S" indicates the number of blocks, and the number followed by "P" indicates the number of inter-membrane passages)
  Membranes: IR1S-3038 (made of polyacrylonitrile)
  Fractioned molecular weight of the membranes: 20,000
  Number of membrane plates: 80
  Membrane area: 28 m$^2$
  Gap between membranes: 3 mm
Circulation pump:
  Line pump (product of Teral Kyokuto Corp., 1.2 m$^3$/min× 5.5 kW)
Suction pump:
  Self-priming pump (product of Ebara Corp., 1.5 m$^3$/hr× 0.4 kW)
Raw liquid:
  Type of raw liquid: Activated sludge at an excreta disposal treatment plant
  MLSS: 10,000 mg/liter
  Supply rate of riquid to circulation tank:8.4m$^3$/hr
(Test Results)

The membrane treatment apparatus was operated under the above-described conditions. The flow rate in the inter-membrane passages between the membrane plates of the membrane treatment apparatus was 1.2 m/sec. The volume flow rate of liquid circulating within the membrane treatment apparatus was 55 m$^3$/hr, and the volume of filtrate obtained through suction filtration was 1.4 m$^3$/hr.

Therefore, although the power of the circulation pump was small, the flow rate of liquid flowing through the inter-membrane passages maintained a level higher than that in inter-membrane passages between the membrane plates of a conventional suction-type membrane treatment apparatus but lower than that in inter-membrane passages between the membrane plates of a conventional pressurized-type membrane treatment apparatus. Simultaneously, a larger volume of liquid was circulated within the membrane treatment apparatus, as compared to the case of the bubble-circulation type membrane treatment apparatus.

Example 2

(Test Conditions)
Membrane apparatus:
  Model: UFP-70 5S17P (product of Mitsui chemicals, INC., the number followed by "S" indicates the number of blocks, and the number followed by "P" indicates the number of inter-membrane passages)
  Membranes: IR1S-3038 (made of polyacrylonitrile)
  Fractioned molecular weight of the membranes: 20,000
  Number of membrane plates: 80
  Membrane area: 28 m$^2$
  Gap between membranes: 3 mm
Circulation pump:
  Line pump (product of Teral Kyokuto Corp., 1.2 m$^3$/min× 5.5 kW)
Raw liquid:
  Type of raw liquid: Activated sludge at an excreta disposal treatment plant
  MLSS: 10,000 mg/liter
Specifications of circulation tank:
  Height of liquid surface from the center of the inlet port 116: 1530 mm
  Volume supplied to the circulation tank: 8.4 m$^3$/hr
  Height of the center of the outlet port 117 from the center of the inlet port 116: 770 mm
  Water head pressure of the circulation tank: 760 mmAq
(Test Results)

The membrane treatment apparatus was operated under the above-described conditions. The flow rate in the inter-membrane passages between the membrane plates of the membrane treatment apparatus was 1.2 m/sec. The volume flow rate of liquid circulating within the membrane treatment apparatus was 55 m$^3$/hr, and the volume of filtrate obtained through suction filtration was 1.4 m$^3$/hr.

The test results demonstrate that if a desired water-head pressure is secured, filtrate can be obtained without use of a suction pump, and membranes can be cleaned through use of a circulation pump of low power.

What is claimed is:

1. A membrane treatment method, comprising the steps of:
  (a) supplying raw liquid from a raw liquid tank to a circulation tank;
  (b) supplying raw liquid and circulation liquid from the circulation tank into an inter-membrane passage formed within the interior of a membrane apparatus divided into a plurality of partition plates forming blocks, wherein each block includes a plurality of filtration membranes, wherein the membrane apparatus is disposed separately from the circulation tank;
  (c) flowing the raw liquid and circulation liquid within the inter-membrane passage upward in alternative blocks and downward in the remaining blocks;
  (d) extracting filtrate from the raw liquid within the inter-membrane passages via the filtration membranes, while returning the remaining raw liquid and circulation liquid to the circulation tank;
  (e) circulating the circulation liquid by a circulation pump, which causes liquid circulation within the inter-membrane passages, and is not designed for applying pressure for extracting filtrate, disposed between the circulation tank and the membrane apparatus; and
  (f) overflowing a portion of the circulation liquid from the circulation tank to the raw liquid tank.

2. A membrane treatment method according to claim 1, wherein a suction pump is used to obtain the filtrate.

3. A membrane treatment method according to claim 1, wherein a water-head pressure of said circulation tank is used to obtain the filtrate.

4. A membrane treatment method according to claim 1 wherein the flow rate of liquid within said inter-membrane passage is in the range of 0.5 to 3.0 m/sec.

5. A membrane treatment apparatus comprising:
  a membrane apparatus including a plurality of filtration membranes disposed to form an inter-membrane passage between the filtration membranes, said membrane apparatus being adapted to extract filtrate from circulation liquid in said inter-membrane passage;
  a circulation tank disposed to said membrane apparatus, the interior of said circulation tank being filled with circulation liquid and raw liquid; and a circulation pump disposed between said circulation tank and said membrane apparatus and adapted to circulate the circulation liquid in order to establish a circulation path that extends from said circulation tank to said inter-membrane passage and then returns to said circulation tank, wherein said circulation tank has a discharge port for overflowing a portion of the circulation liquid and the raw liquid from said circulation tank;

wherein said discharge port is located at a position higher than the center of an outlet port of said membrane apparatus; and wherein the interior of said membrane apparatus is divided into a plurality of partition plates forming blocks, such that alternate partition plates have a liquid path opening at their upper portions and the remaining partition plates have the liquid path openings at their lower portions, and a plurality of membrane plates are vertically disposed in each block, each of said membrane plates comprising a membrane support plate having upper and lower openings and flat filtration membranes fixed to opposite side surfaces of said membrane support plate.

6. A membrane treatment apparatus according to claim 5, wherein a suction pump for sucking and obtaining the filtrate is disposed in a liquid path for taking out the filtrate.

7. A membrane treatment apparatus comprising:

a plurality of membrane processing units, each comprising a membrane apparatus including a plurality of filtration membranes disposed to form an inter-membrane passage between the filtration membranes, said membrane apparatus being adapted to extract filtrate from circulation liquid in said inter-membrane passage, a circulation tank disposed to said membrane apparatus, the interior of said circulation tank being filled with circulation liquid and raw liquid, and a circulation pump disposed between said circulation tank and said membrane apparatus and adapted to circulate the circulation liquid in order to establish a circulation path that extends from said circulation tank to said inter-membrane passage and then returns to said circulation tank;

wherein said circulation tank has a discharge port for overflowing a portion of the circulation liquid and the raw liquid from said circulation tank;

wherein said discharge port is located at a position higher than the center of an outlet port of said membrane apparatus;

wherein the interior of said membrane apparatus is divided into a plurality of partition plates forming blocks, such that alternate partition plates have a liquid path opening at their upper portions and the remaining partition plates have the liquid path openings at their lower portions, and a plurality of membrane plates are vertically disposed in each block, each of said membrane plates comprising a membrane support plate having upper and lower openings and flat filtration membranes fixed to opposite side surfaces of said membrane support plate;

a raw liquid tank provided for said plurality of membrane treatment units; and one raw liquid pump or a plurality of raw liquid pumps for supplying raw liquid to said circulation tank of each membrane treatment unit, the number of said raw liquid pump(s) being smaller than the number of said membrane treatment units.

8. In a membrane treatment apparatus comprising a membrane apparatus including a plurality of filtration membranes disposed to form an inter-membrane passage between the filtration membranes, said membrane apparatus being adapted to extract filtrate from circulation liquid in said inter-membrane passage, the interior of said membrane apparatus being divided into a plurality of partition plates forming blocks, such that alternate partition plates have a liquid path opening at their upper portions and the remaining partition plates have the liquid path openings at their lower portions, and a plurality of membrane plates are vertically disposed in each block, each of said membrane plates compromising a membrane support plate having upper and lower openings and flat filtration membranes fixed to opposite side surfaces of said membrane support plate.

* * * * *